United States Patent
Tiwari

(10) Patent No.: US 9,374,797 B2
(45) Date of Patent: Jun. 21, 2016

(54) MOBILE COMMUNICATION DEVICES AND METHODS FOR HANDLING A COMBINED ATTACH OR ROUTING AREA UPDATE PROCEDURE SUCCESSFUL FOR PS DOMAIN SERVICES ONLY

(71) Applicant: HTC Corporation, Taoyuan, Taoyuan County (TW)

(72) Inventor: Kundan Tiwari, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 483 days.

(21) Appl. No.: 13/887,834

(22) Filed: May 6, 2013

(65) Prior Publication Data

US 2013/0295930 A1 Nov. 7, 2013

Related U.S. Application Data

(60) Provisional application No. 61/643,675, filed on May 7, 2012.

(51) Int. Cl.
 *H04Q 7/20* (2006.01)
 *H04W 60/00* (2009.01)

(52) U.S. Cl.
 CPC .................... *H04W 60/00* (2013.01)

(58) Field of Classification Search
 CPC ........................................ H04W 4/14
 USPC .............................. 455/435.2, 433
 See application file for complete search history.

(56) References Cited

U.S. PATENT DOCUMENTS 7,346,348 B1 * 3/2008 Gazzard ................ H04W 8/06
370/315

(Continued)

FOREIGN PATENT DOCUMENTS

| CN | 1889748 A | 1/2007 |
|---|---|---|
| EP | 2 448 345 A2 | 5/2012 |
| TW | 201215201 A1 | 4/2012 |
| TW | 2 469 944 A1 | 6/2012 |

OTHER PUBLICATIONS

3GPP TS 24.008 V11.2.1 (Mar. 2012) Technical Specification Group Core Network and Terminals; Mobile radio interface Layer 3 specification; Core network protocols; Stage 3 (Release 11), pp. 1-659.

(Continued)

*Primary Examiner* — Vladimir Magloire
*Assistant Examiner* — Randy Peaches
(74) *Attorney, Agent, or Firm* — Birch, Stewart, Kolasch & Birch, LLP

(57) ABSTRACT

A communication device is provided with a wireless module and a controller module. The wireless module performs wireless transceiving to and from a service network. The controller module performs a combined attach or RAU procedure by transmitting an attach or RAU request message to the service network via the wireless module, and receives an attach or RAU accept message for the combined attach or RAU procedure, which includes a reject cause for CS domain services, from the service network via the wireless module. Also, the controller module prohibits retrying the combined attach or RAU procedure to obtain the CS domain services, in response to the attach or RAU accept message including the reject cause for the CS domain services.

12 Claims, 4 Drawing Sheets

(56) References Cited

U.S. PATENT DOCUMENTS

| | | | | |
|---|---|---|---|---|
| 2005/0272422 A1* | 12/2005 | Asadi | ............... | H04W 60/06 455/432.2 |
| 2011/0026469 A1 | 2/2011 | Wu | | |
| 2011/0268092 A1 | 11/2011 | Tiwari | | |
| 2012/0106332 A1* | 5/2012 | Tiwari | ............... | H04W 60/005 370/230 |
| 2013/0150031 A1* | 6/2013 | Hedman | ............... | H04W 4/14 455/433 |

OTHER PUBLICATIONS

HTC, "Change Request 24.008, CR 2203, rev. 2, Current version: 11.3.0," 3GPP TSG-CT WG1 Meeting #79, C1-123379, rev. of C1-122780/C1-123215, Aug. 6-10, 2012, Chicago, IL.

3GPP, "Technical Specification Group Core Network and Terminals; Mobile Radio Interface Layer 3 Specification; Core Network Protocols; Stage 3 (Release 8)," 3GPP TS 24.008 V8.14.0, Jun. 2011, pp. 1-593.

* cited by examiner

MOBILE COMMUNICATION DEVICES AND METHODS FOR HANDLING A COMBINED ATTACH OR ROUTING AREA UPDATE PROCEDURE SUCCESSFUL FOR PS DOMAIN SERVICES ONLY

CROSS REFERENCE TO RELATED APPLICATIONS

This Application claims priority of U.S. Provisional Application No. 61/643,675, filed on May 7, 2012, and the entirety of which is incorporated by reference herein.

BACKGROUND OF THE INVENTION

1. Field of the Invention

The invention generally relates to the handling of a combined attach or Routing Area Update (RAU) procedure, and more particularly, to mobile communication devices and methods for handling a combined attach or RAU procedure which is successful for Packet-Switched (PS) domain services only.

2. Description of the Related Art

In a typical mobile communications environment, a Mobile Station (MS) (or called User Equipment (UE)), such as a cell phone, may communicate voice and/or data signals with one or more service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Taking the WCDMA technology in compliance with the 3GPP TS 24.008 specification, v11.3.0 (referred to herein as the TS 24.008 specification) as an example, a service network supporting the WCDMA technology (referred to herein as a WCDMA network) may include a Circuit-Switched (CS) domain and a Packet-Switched (PS) domain which are responsible for providing CS domain services and PS domain services, respectively. For signaling efficiency, an MS may performed a combined attach procedure or a combined RAU procedure with a WCDMA network which operates in the Network Mode of Operation (NMO) I, to simultaneously register to both of the CS and PS domains of the WCDMA network, thereby obtaining the CS and PS domain services. However, the combined attach or RAU procedure may be successful for the GPRS services (i.e., the PS domain services) only. In such a case, the MS will keep retrying the combined attach or RAU procedure, hoping to obtain the CS domain services, and the retrying of the combined attach or RAU procedure for the CS domain services only will increase PS signaling which may lead to congestion in the PS domain of the WCDMA network.

BRIEF SUMMARY OF THE INVENTION

In order to solve the aforementioned problem, the invention proposes a mobile communication device and a method for handling a combined attach or RAU procedure which is successful for PS domain services only.

In one aspect of the invention, a mobile communication device comprising a wireless module and a controller module is provided. The wireless module is configured to perform wireless transceiving to and from a service network. The controller module is configured to perform a combined attach procedure or a combined RAU procedure by transmitting an attach request message or an RAU request message to the service network via the wireless module, and receive an attach accept message or an RAU accept message for the combined attach procedure or the combined RAU procedure, which comprises a reject cause for Circuit-Switched (CS) domain services, from the service network via the wireless module. Also, the controller module is further configured to prohibit retrying the combined attach procedure or the combined RAU procedure to obtain the CS domain services, in response to the attach accept message or the RAU accept message comprising the reject cause for the CS domain services.

In another aspect of the invention, a method for a mobile communication device to handle a combined attach procedure or a combined RAU procedure which is successful for PS domain services only is provided. The method comprises the steps of: performing the combined attach procedure or the combined RAU procedure by transmitting an attach request message or an RAU request message to a service network; receiving an attach accept message or an RAU accept message for the combined attach procedure or the combined RAU procedure, which comprises a reject cause for CS domain services, from the service network; and prohibiting retrying the combined attach procedure or the combined RAU procedure to obtain the CS domain services, in response to the attach accept message or the RAU accept message comprising the reject cause for the CS domain services.

Other aspects and features of the invention will become apparent to those with ordinary skill in the art upon review of the following descriptions of specific embodiments of the mobile communication devices and methods for handling a combined attach procedure or a combined RAU procedure which is successful for PS domain services only.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specification(s) is/are used to teach the spirit of the invention, and the invention is not limited thereto. The scope of the invention is best determined by reference to the appended claims.

Figure 1:
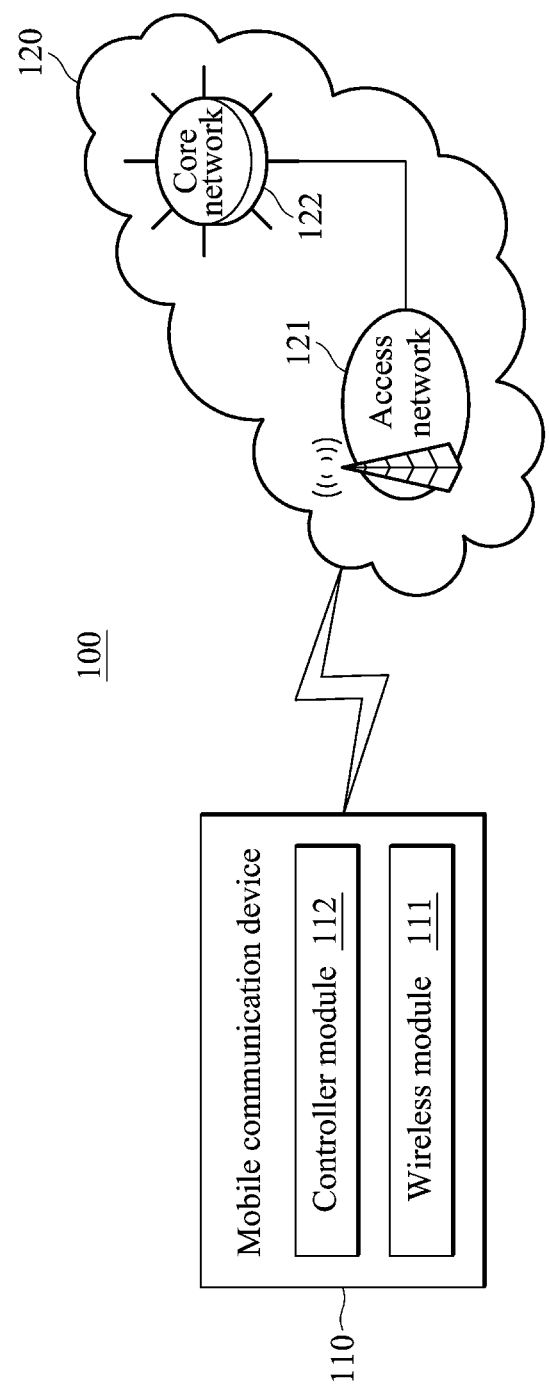
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is wirelessly connected to the service network 120 for obtaining wireless services, including CS and PS domain services. The mobile communication device 110 may be a cell phone, a tablet PC, a notebook PC, or any other portable devices which is capable of wireless communications with the service network 120. The service network 120 comprises an access network 121 and a core network 122. The service network may be a WCDMA network (including HSDPA, HSUPA, and HSPA networks) (or called a Universal Mobile Telecommunications System (UMTS)) operating in the NMO I which supports combined attach procedures and combined RAU procedures, and the access network 121 may be a UMTS Terrestrial Radio Access Network (UTRAN) while the core network 122 may be a GPRS core which is logically divided into two distinct domains: CS domain and PS domain.

To further clarify, if the service network 120 is a WCDMA network, the CS domain of the service network 120 at least may include a Mobile Switching Center (MSC), a Visiting Location Register (VLR), a Home Location Register (HLR), and a Gateway MSC (GMSC), and the PS domain of the service network 120 at least may include a Serving GPRS Support Node (SGSN) and a Gateway GPRS Support Node (GGSN).

The mobile communication device 110 comprises a wireless module 111 for performing the functionality of wireless transceiving to and from the service network 120, and a controller module 112 for controlling the operation of the wireless module 111. Although not shown, the mobile communication device 110 may comprise other functional components, such as a display unit and/or keypad serving as the MMI (man-machine interface), a storage unit storing the program codes of applications or communication protocols, or others. Particularly, the controller module 112 controls the wireless module 111 for performing the method of the invention for handling a combined attach procedure or a combined RAU procedure which is successful for PS domain services only.

To further clarify, the wireless module 111 may be a Radio Frequency (RF) unit, and the controller module 112 may be a general-purpose processor or a Micro-Control Unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or others depending on the wireless technology in use.

Figure 2:
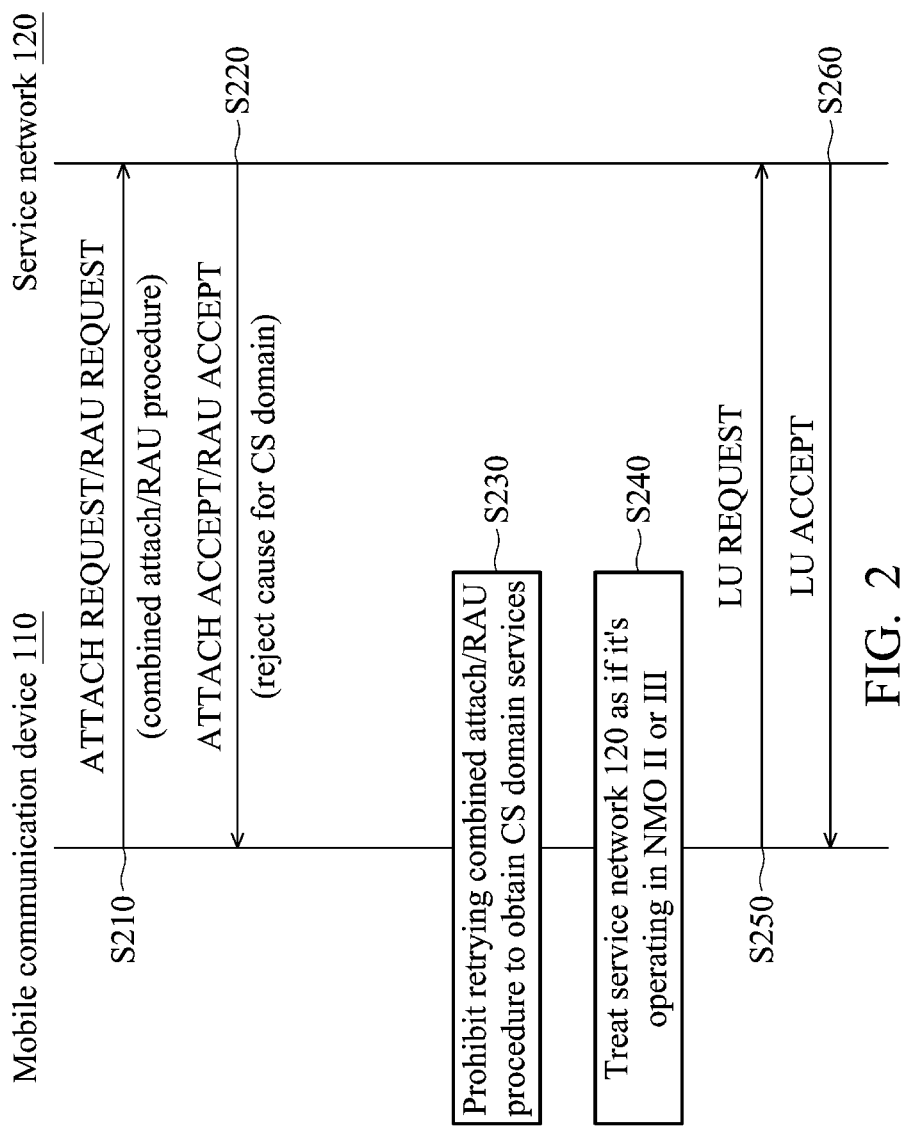
FIG. 2 is a message sequence chart illustrating the handling of a combined attach procedure or a combined RAU procedure which is successful for PS domain services only according to an embodiment of the invention.

FIG. 2 is a message sequence chart illustrating the handling of a combined attach procedure or a combined RAU procedure which is successful for PS domain services only according to an embodiment of the invention. In this embodiment, the service network 120 is a WCDMA network and the mobile communication device 110 is an MS or UE, both of which operate in compliance with the TS 24.008 specification and/or other related specifications of the WCDMA technology. To begin, the mobile communication device 110 performs a combined attach procedure or a combined RAU procedure by transmitting an ATTACH REQUEST message or an RAU REQUEST message to the service network 120 (step S210). Next, the mobile communication device 110 receives an ATTACH ACCEPT or RAU ACCEPT message for the combined attach procedure or the combined RAU procedure, which comprises a reject cause for CS domain services, from the service network (step S220). Specifically, the reject cause may indicate that congestion or network failure has occurred in the CS domain of the service network 120, or indicate that the CS domain of the service network 120 is temporarily not reachable through the PS domain of the service network 120, i.e., the MSC of the service network 120 is temporarily not reachable. According to the TS 24.008 specification, the reject cause is set to #22 or #17 for indicating that a congestion or network failure has occurred in the CS domain of the service network 120, or set to #16 for indicating that the CS domain is temporarily not reachable through the PS domain. In response to the attach/RAU accept message, the mobile communication device 110 prohibits retrying the combined attach procedure or the combined RAU procedure to obtain the CS domain services (step S230).

Subsequently, the mobile communication device 110 treats the service network 120 as if the service network 120 is operating in the NMO II or III (step S240), and initiates a Location Update (LU) procedure to obtain the CS domain services by transmitting an LU REQUEST message to the service network 120 (step S250). In reply, the mobile communication device 110 receives an LU ACCEPT message from the service network 120, and is successfully registered to the CS domain of the service network 120 for obtaining the CS domain services (step 260).

Figure 3:
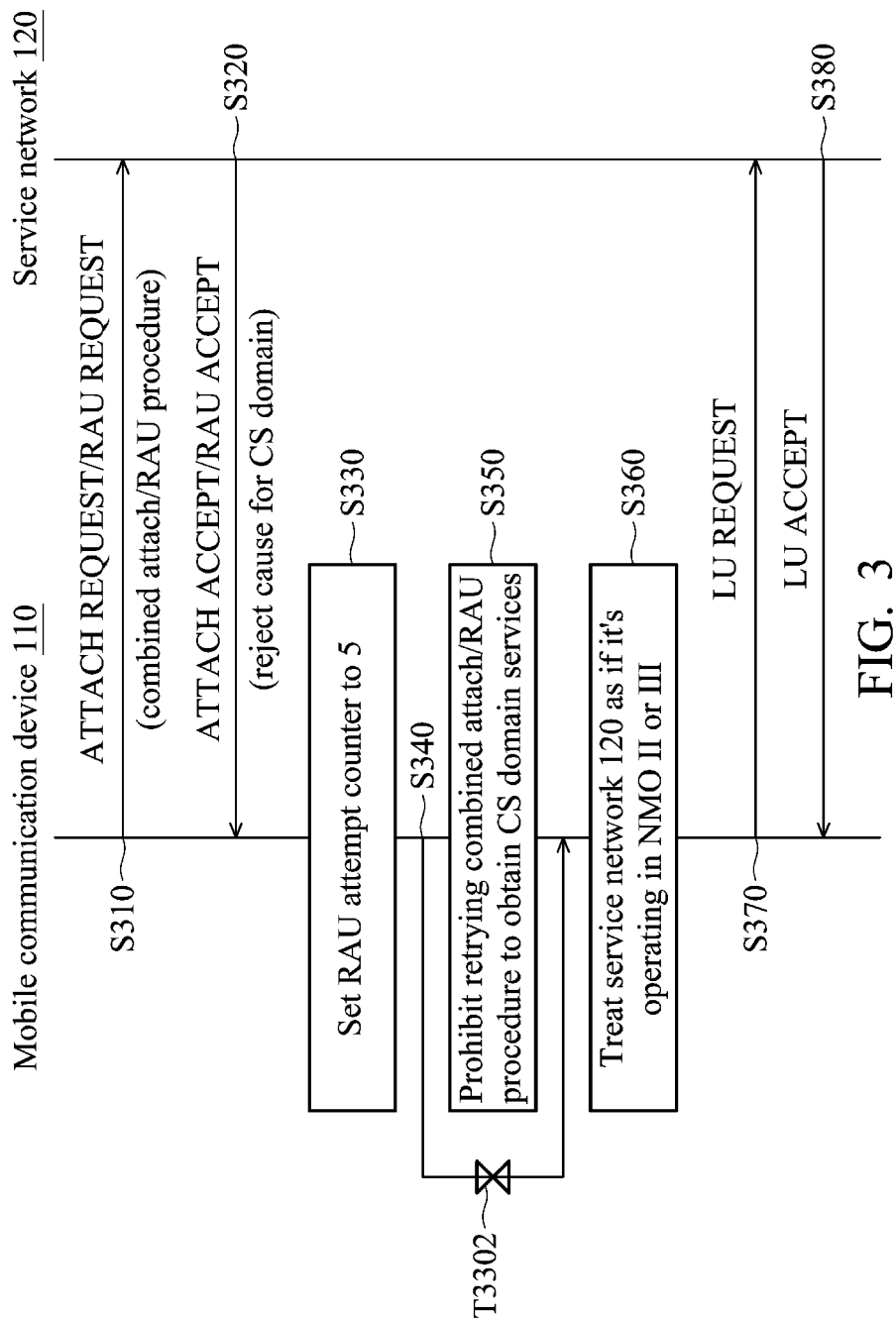
FIG. 3 is a message sequence chart illustrating the handling of a combined attach procedure or a combined RAU procedure which is successful for PS domain services only according to another embodiment of the invention.

FIG. 3 is a message sequence chart illustrating the handling of a combined attach procedure or a combined RAU procedure which is successful for PS domain services only according to another embodiment of the invention. Similar to the embodiment of FIG. 2, the service network 120 is a WCDMA network and the mobile communication device 110 is an MS or UE, both of which operate in compliance with the TS 24.008 specification and/or other related specifications of the WCDMA technology. To begin, the mobile communication device 110 performs a combined attach procedure or a combined RAU procedure by transmitting an attach request message or an RAU request message to the service network 120 (step S310). Next, the mobile communication device 110 receives an attach/RAU accept message for the combined attach procedure or the combined RAU procedure, which comprises a reject cause for CS domain services, from the service network (step S320). Detailed description of the reject cause is the same as described in the embodiment of FIG. 2, and it is omitted herein for brevity. In response to the attach/RAU accept message, the mobile communication device 110 sets the RAU attempt counter to 5 (step S330) and starts the T3302 timer for counting a 12-minute time duration (step S340).

Subsequently, the mobile communication device 110 prohibits retrying the combined attach procedure or the combined RAU procedure to obtain the CS domain services when the T3302 timer is running (step S350). When the T3302 timer expires, the mobile communication device 110 treats the service network 120 as if the service network 120 is operating in the NMO II or III (step S360), and initiates an LU procedure to obtain the CS domain services by transmitting an LU request message to the service network 120 (step S370). In reply, the mobile communication device 110 receives an LU accept message from the service network 120, and is successfully registered to the CS domain of the service network 120 for obtaining the CS domain services (step 380).

Note that, in one embodiment, the mobile communication device 110 may be a general MS or UE. In another embodiment, the mobile communication device may be a delay tolerant MS or UE, i.e., a low priority device which is dedicated for Machine Type Communication (MTC) services, or a normal device which initiates the combined attach procedure or the combined RAU procedure for Short Message Services (SMS) only.

Figure 4:
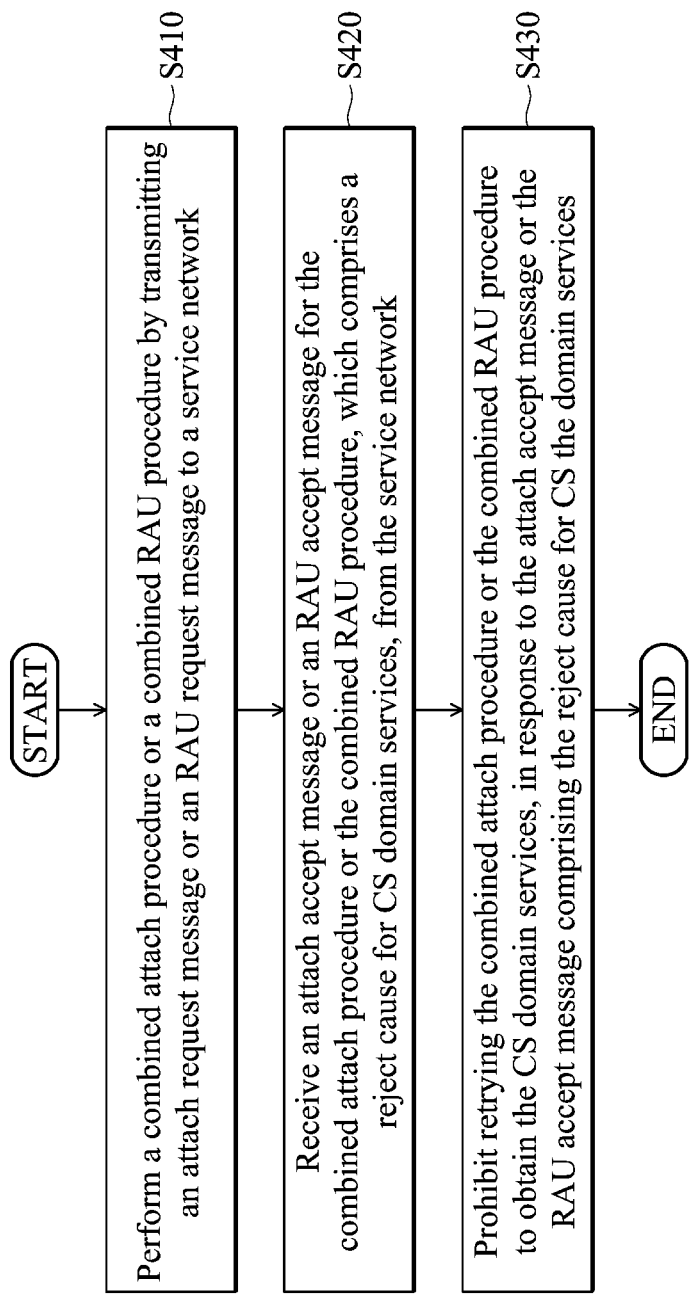
FIG. 4 is a flow chart illustrating the method for handling a combined attach procedure or a combined RAU procedure which is successful for PS domain services only according to an embodiment of the invention.

FIG. 4 is a flow chart illustrating the method for handling a combined attach procedure or a combined RAU procedure which is successful for PS domain services only according to an embodiment of the invention. In this embodiment, the method is applied to a mobile communication device, such as the mobile communication device 110, which is wirelessly communicating with a service network operating in the NMO I. To begin, the mobile communication device performs a combined attach procedure or a combined RAU procedure by transmitting an attach/RAU request message to the service network (step S410). Next, the mobile communication device receives an attach/RAU accept message for the combined attach procedure or the combined RAU procedure, which comprises a reject cause for CS domain services, from the service network (step S420). After that, the mobile communication device prohibits retrying the combined attach procedure or the combined RAU procedure to obtain the CS domain services, in response to the attach/RAU accept message comprising the reject cause for the CS domain services (step S430). In one embodiment, after prohibiting the retrying of the combined attach procedure or the combined RAU procedure, the mobile communication device may immediately switch to perform an LU procedure to obtain the CS domain services. Alternatively, in another embodiment, the mobile communication device may start a timer to wait for a period of time before switching to perform the LU procedure.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling a combined attach procedure or a combined RAU procedure which is successful for PS domain services only may also be applied to other mobile communication devices using the CDMA-2000 technology, the TD-SCDMA technology, or any other wireless technology in which the core architecture is logically divided into the CS domain and the PS domain. Therefore, the scope of the invention shall be defined and protected by the following claims and their equivalents.

What is claimed is:

1. A mobile communication device, comprising:
    a wireless module, configured to perform wireless transceiving to and from a service network; and
    a controller module, configured to perform a combined attach procedure or a combined Routing Area Update (RAU) procedure by transmitting an attach request message or an RAU request message to the service network via the wireless module, receive an attach accept message or an RAU accept message for the combined attach procedure or the combined RAU procedure, which comprises a reject cause for Circuit-Switched (CS) domain services, from the service network via the wireless module, and prohibit retrying the combined attach procedure or the combined RAU procedure to obtain the CS domain services, in response to the attach accept message or the RAU accept message comprising the reject cause for the CS domain services; wherein the reject cause indicates that a congestion or network failure has occurred in the CS domain of the service network, or indicates that the CS domain of the service network is temporarily not reachable through the PS domain of the service network.

2. The mobile communication device of claim 1, wherein the combined attach procedure or the combined RAU procedure is performed for Machine Type Communication (MTC) services or Short Message Services (SMS) only.

3. The mobile communication device of claim 1, wherein the controller module is further configured to treat the service network as if the service network is operating in a Network Mode of Operation (NMO) II or III, and initiate a Location Update (LU) procedure via the wireless module to obtain the CS domain services, in response to the attach accept message or the RAU accept message comprising the reject cause for the CS domain services.

4. The mobile communication device of claim 1, wherein the controller module is further configured to set an RAU attempt counter to 5 and start a timer of 12 minutes.

5. The mobile communication device of claim 4, wherein the retrying of the combined attach procedure or the combined RAU procedure is prohibited when the timer is running.

6. The mobile communication device of claim 4, wherein, when the timer expires, the controller module is further configured to treat the service network as if the service network is operating in a Network Mode of Operation (NMO) II or III, and initiate a Location Update (LU) procedure via the wireless module to obtain the CS domain services.

7. A method for a mobile communication device to handle a combined attach procedure or a combined Routing Area Update (RAU) procedure which is successful for PS domain services only, comprising:
    performing the combined attach procedure or the combined RAU procedure by transmitting an attach request message or an RAU request message to a service network;
    receiving an attach accept message or an RAU accept message for the combined attach procedure or the combined RAU procedure, which comprises a reject cause for Circuit-Switched (CS) domain services, from the service network; and prohibiting retrying the combined attach procedure or the combined RAU procedure to obtain the CS domain services, in response to the attach accept message or the RAU accept message comprising the reject cause for the CS domain services; wherein the reject cause indicates that a congestion or network failure has occurred in the CS domain of the service network, or indicates that the CS.

8. The method of claim 7, wherein the combined attach procedure or the combined RAU procedure is performed for Machine Type Communication (MTC) services or Short Message Services (SMS) only.

9. The method of claim 7, further comprising, in response to the attach accept message or the RAU accept message comprising the reject cause for the CS domain services: treating the service network as if the service network is operating in a Network Mode of Operation (NMO) II or III; and initiating a Location Update (LU) procedure to obtain the CS domain services.

10. The method of claim 7, further comprising: setting an RAU attempt counter to 5; and starting a timer of 12 minutes.

11. The method of claim 10, wherein the retrying of the combined attach procedure or the combined RAU procedure is prohibited when the timer is running.

12. The method of claim 10, further comprising, when the timer expires: treating the service network as if the service network is operating in a Network Mode of Operation (NMO) II or III; and initiating a Location Update (LU) procedure to obtain the CS domain services.

* * * * *